(12) United States Patent
Bradford et al.

(10) Patent No.: US 7,247,098 B1
(45) Date of Patent: Jul. 24, 2007

(54) COMBINATION FINGERPRINT READER AND I/O DEVICES FOR GAMING MACHINES

(75) Inventors: Russell T. Bradford, Incline Village, NV (US); Robert A. Luciano, Jr., Reno, NV (US)

(73) Assignee: Sierra Design Group, Reno, NV (US)

( * ) Notice: Subject to any disclaimer, the term of this patent is extended or adjusted under 35 U.S.C. 154(b) by 594 days.

(21) Appl. No.: 10/387,288

(22) Filed: Mar. 12, 2003

Related U.S. Application Data

(60) Provisional application No. 60/364,336, filed on Mar. 14, 2002.

(51) Int. Cl.
*A63F 13/00* (2006.01)

(52) U.S. Cl. .......................................................... 463/47

(58) Field of Classification Search .................. 463/47
See application file for complete search history.

(56) References Cited

U.S. PATENT DOCUMENTS

| | | | | |
|---|---|---|---|---|
| 5,386,934 A | * | 2/1995 | Lawrence .................... | 226/181 |
| 5,544,728 A | * | 8/1996 | Dabrowski .................... | 194/206 |
| 5,955,718 A | * | 9/1999 | Levasseur et al. ........... | 235/381 |
| 6,533,659 B2 | * | 3/2003 | Seymour et al. .............. | 463/16 |
| 6,852,029 B2 | * | 2/2005 | Baltz et al. .................... | 463/25 |
| 6,896,618 B2 | * | 5/2005 | Benoy et al. .................. | 463/25 |
| 2002/0142846 A1 | * | 10/2002 | Paulsen ........................ | 463/43 |

* cited by examiner

*Primary Examiner*—Mark Sager
*Assistant Examiner*—Robert Mosser
(74) *Attorney, Agent, or Firm*—Steptoe & Johnson LLP

(57) ABSTRACT

A replacement device for a conventional bill acceptor in a gaming machine, located in the same space as the bill acceptor, has a bill acceptor or voucher reader/printer, plus at least a fingerprint reader. In one preferred embodiment, the new device has a bill acceptor, fingerprint reader, magnetic strip card reader, and an LCD screen. All interface to the existing game processor board using the bill acceptor's existing serial connection, and optionally to backend systems using an ethernet connection directly from the new device.

13 Claims, 6 Drawing Sheets

Prior Art Gaming Machine
With Bill Acceptor

Block Diagram Of A Combination Device System Controller According To The Present Invention

COMBINATION FINGERPRINT READER AND I/O DEVICES FOR GAMING MACHINES

RELATED APPLICATIONS

This application claims the benefit of provisional application 60/364,336 filed on Mar. 14, 2002 and entitled "Improved Fingerprint Reader For Gaming Machines".

BACKGROUND OF THE INVENTION

1. Field of the Invention

This invention pertains generally to gaming machines. More particularly, the present invention discloses a method and apparatus for providing gaming machines with a means for using fingerprint data and other player I/O devices that minimizes cost on new and retrofit devices inside gaming cabinets.

2. The Prior Art

Gaming machines having a bill acceptor are generally well known. An example of a slant-top style gaming machine is shown in FIG. 1. A typical gaming machine 100 has a top candle 102, a glass art area 104, bill acceptor 106 (shown in typical locations), reel display area 108, reel panel 110, and player input devices (usually buttons) 112.

Each of the devices and displays in a gaming machine must have a power supply, electrical interface, and device drivers supporting a logical interface into the gaming machine's main processor board (mother board, game board). Adding any new separate (individual) device is an expensive undertaking, because each such added individual device must be both physically and logically connected to the main processor board. In addition, the room available on the front panel of gaming machine is extremely limited; adding several individual devices on the front of a game machine, easily within reach of a player, is a problem.

There is a need to introduce, into gaming machines, the added security features and benefits of a fingerprint reader in a manner that minimizes changes to existing motherboards (for retrofits), eases serviceability, and minimizes the amount of space used on the front of a gaming machines.

BRIEF DESCRIPTION OF THE INVENTION

The device of the present invention provides a method and system for enabling fingerprint readers to be cost effectively added to existing gaming machines, the gaming machines being those typically found in Nevada-style casinos, Amerindian Class III style casinos, and Amerindian Class II style casinos. This has been done buy creating a new combination device, the combination device including at least a fingerprint reading component and one of: a bill acceptor component; or, a voucher reading/printing component. This new combination device may be called a player I/O device, as it combines into a new and useful single device functions previously carried out by individual player I/O devices which were connected to a motherboard using multiple individual connections and/or multiplexed connections.

The present invention uses an existing internal game machine connection; the same connection as is currently used by the bill acceptor (or the voucher printer/reader). In existing machines this is a serial connection, with existing bill acceptors having a serial port that is used to connect with gaming machines' motherboard serial connection (typically also a port with a serial line connecting the two).

Note: it some cases there may be bill acceptors having extended connectors rather than a port receivable for wiring from a wiring harness inside the game cabinet. In these cases, the bill acceptors' (or voucher printer/reader) extended wiring plugs into the motherboard or into a pin compatible receptacle in a wiring harness that operably connects the bill acceptor (voucher printer/reader) to the motherboard, which processes the bill acceptor or voucher data. For the purposes of this application, any reference to a serial port (or ethernet port) will be understood to include such variants; any connection that allows for serial communications is included in the concept of "serial port" and likewise for references to ethernet ports.

Thus, the new player I/O device of the present invention will include at least a serial port available for external connections, where "external connections" includes any operable wiring connection to a game cabinet's wiring or directly connecting to the game's motherboard. Optionally, an ethernet port will also be provided (expected to be significantly more popular in a few years).

The new player I/O device will also include a face plate component, which will have the interfaces usable by a player such as the place to put a finger for reading a fingerprint, a place to insert paper currency or vouchers, a place to swipe a magnetic stripe card, an LCD touchscreen with numbers and/or letters and/or choice buttons selectable by a player thereon, a place to insert a smart card or memory card, or a port that can interact with an IR or RF device (many PDAs have IR input/output, for example).

The new player I/O device has a main body that is made up of an enclosure, the enclosure holding (or providing a guide for, as bulk storage may be in the gaming machine) paper currency or vouchers, the parts of the components not in the face plate, and the controller for the device. The enclosure is designed and shaped to both fit into an existing game cabinet, and to align the bill/voucher receptacles to make use of the same portion of the front panel as the existing bill or voucher processing units did. Note that the face plate of the new player I/O device will be larger than the face plate it replaces, so the unit as a whole will appear larger to a player than the unit it replaces (a substantive portion will sit "on top of" the outside portion of the gaming cabinet door). When used with the remotely mounted faceplate, however, the new player I/O device can make use of the existing hole in the door for the older bill or voucher processing device. In this case, the remotely mounted faceplate will be connected to the body of the combination device (player I/O device) using a wiring harness between the two. The advantage is that no modifications will be required to the game cabinet—a significant advantage when retrofitting games already in the field.

Returning to internal connectivity, by making use of the existing bill acceptor or voucher printer/reader serial ports, no changes need be made to internal, already existing wiring harnesses. The player I/O device controller will be the communications interface between the components of the player I/O device and the game machine's serial interface. If the player I/O device is equipped with an ethernet port as well as a serial port, the controller will be configured to select with communications path (port) to use with which component.

MORE DETAILED DESCRIPTION OF THE INVENTION

Figure 1:
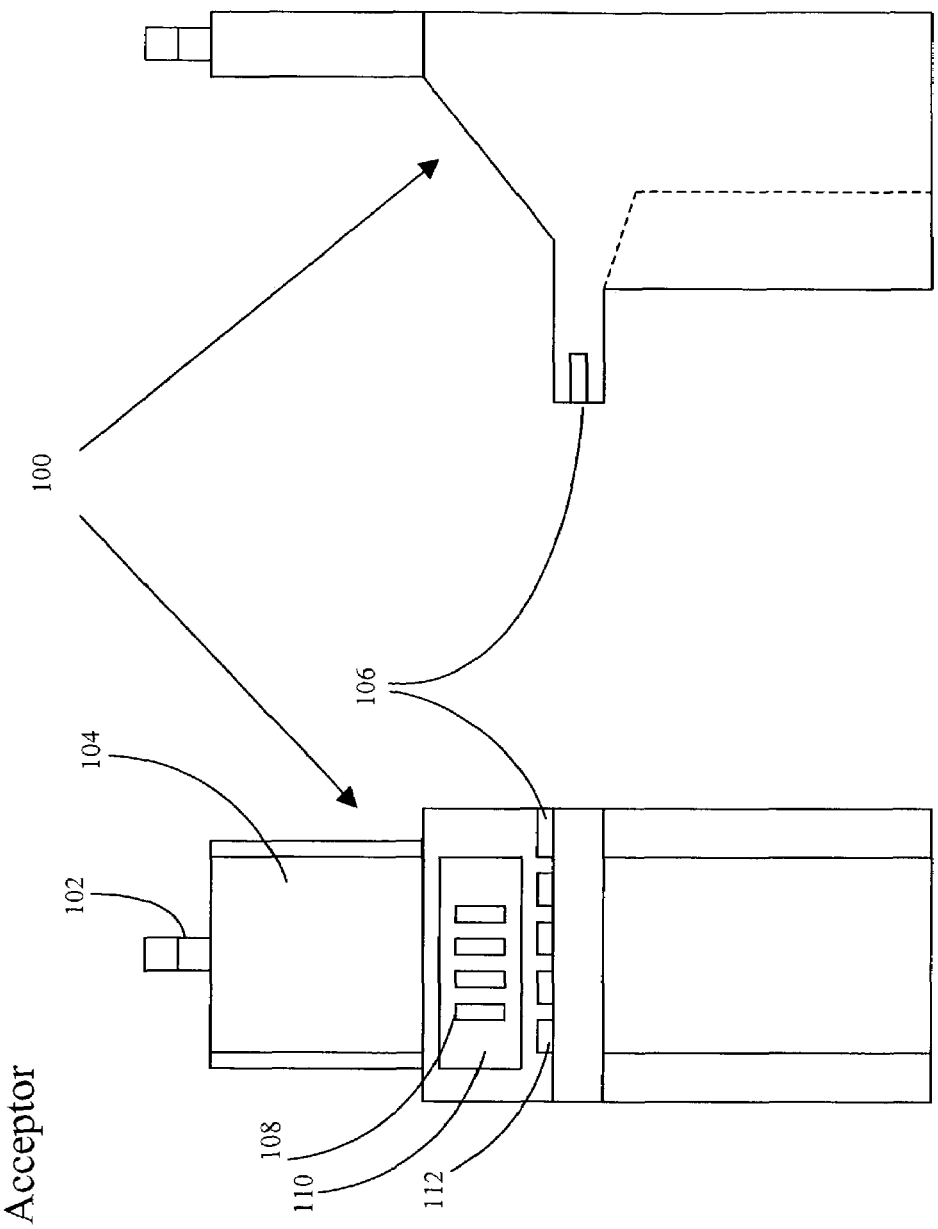
FIG. 1 is an illustration of a prior art gaming machine.

Persons of ordinary skill in the art and with the benefit of the present disclosure will realize that the following description of the present invention is illustrative only, and is not limiting. Other embodiments of the invention will readily suggest themselves when such skilled persons have the benefit of the present disclosure.

Referring to the drawings, for illustrative purposes the present invention is shown embodied in FIGS. 2 through 6. It will be appreciated that the apparatus may vary as to configuration and as to details of the parts without departing from the inventive concepts disclosed herein. The methods may vary as to details, partitioning, repetition, and action order or inclusion without departing from the inventive concepts disclosed herein.

Figure 2:
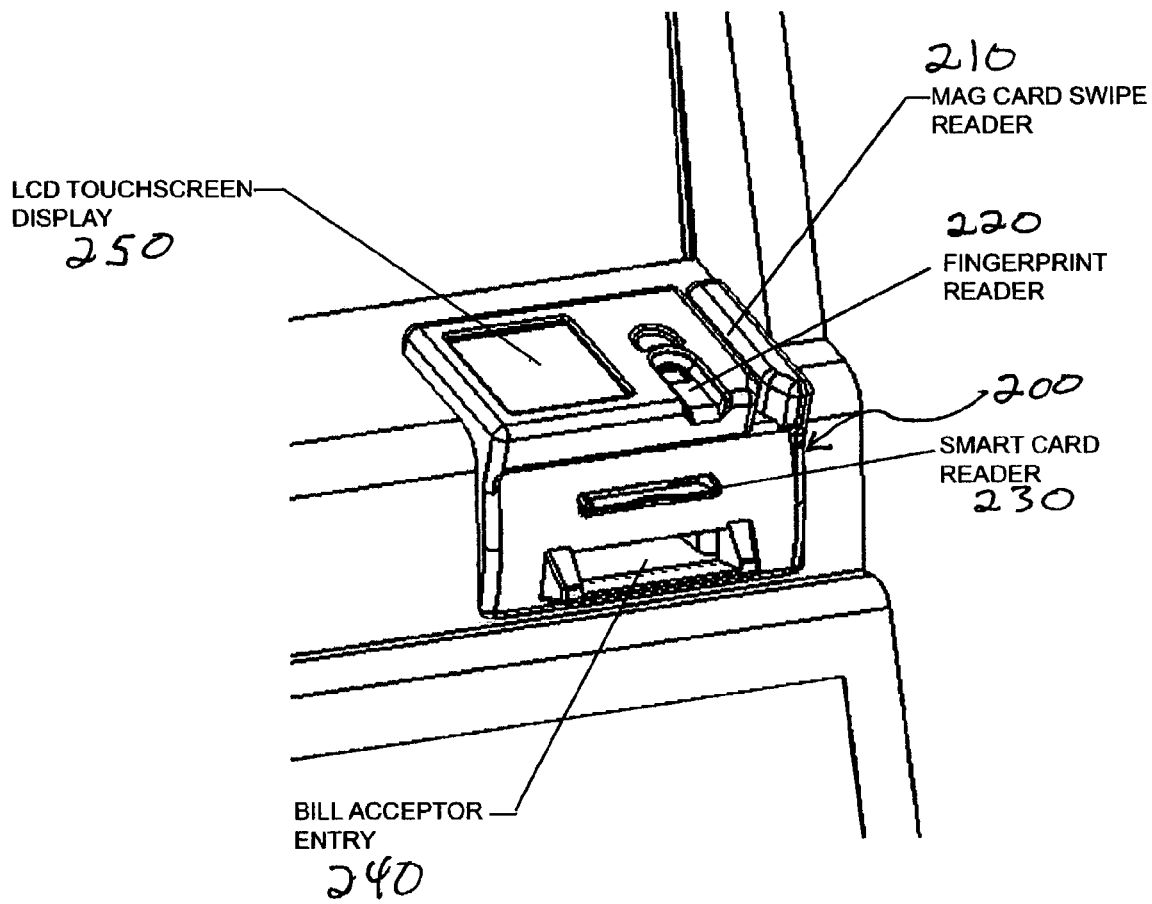
FIG. 2 is a perspective view of a gaming having a device according to the present invention.

One embodiment of the present invention is shown in FIG. 2. Shown on the front of a gaming cabinet is combination device 200. Combination device 200 is designed to fit into the area inside the gaming machine and use the front panel area on the front of a gaming machine currently occupied by a standard bill acceptor. It does this by combining, in an integrated unit, at least a bill acceptor and a fingerprint reader with (optionally) a magnetic stripe card reader, smart card dock, and LCD touchscreen. Shown is one embodiment having a standard bill acceptor 240, a fingerprint reader 220, an LCD touchscreen I/O device 250, a magnetic stripe card reader 230, and a smart card reader 230.

Figure 3:
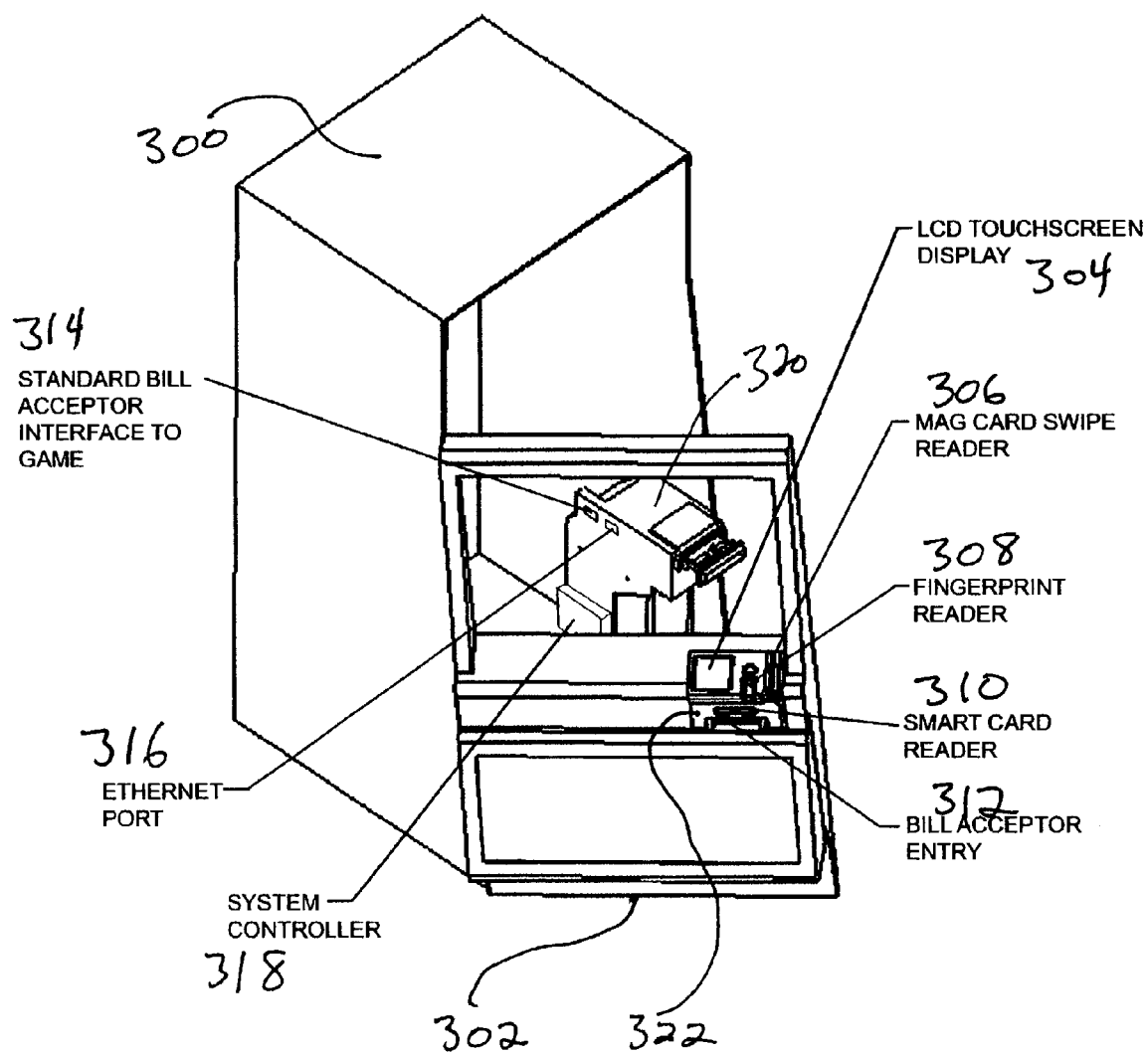
FIG. 3 is a second perspective view of a gaming having a device according to the present invention.

FIG. 3 illustrates how the device of the present invention makes use of a standard bill acceptor opening in the door of a pre-existing game cabinet. Game cabinet 300 has door 302 in the open position. There are two parts that make up the combination device, plus components therein. The two parts include a bill acceptor tray and combination device body assembly (combination device) 320 and a face-plate assembly 322. Face plate assembly 322 comprises an LCD touchscreen display 304, magnetic stripe card reader input portion 306, fingerprint reader portion 308, smart card reader (or dock) 310 (may also be vertical), and bill acceptor entry slot 312 (guides bills to the bill acceptor portion of combination device 320). Face plate assembly 322 will stay on the door, as shown. Face plate assembly 322 is electrically connected to combination device 320 using a wiring harness that runs from the face plate assembly to the main body of the combination device 320 (wiring harness not shown). Face plate assembly 322 provides player interfaces to each component of the combination device; in some cases, such as the LCD touchscreen display, the face plate contains the entire I/O device with only some supporting logic in the main body 320. Combination device 320 also contains combination device system controller (system controller) 318, which contains the logic needed to receive signals from each of the devices that are part of the combination device 320 and face-plate assembly 322. In addition, system controller 318 contains the logic needed to interpret, reformat (or simply format, depending on the input signals), and send the data received from any of the input devices in this assembly to the standard bill acceptor interface 314, and/or Ethernet port 316 (depending on which embodiment is used).

Combination device main body 320 is shown as having an enclosure, in which, and mounted on, are the combination devices or components. It is to be understood that the main body enclosure itself can be any structure that provides the needed internal mounting points or mounting devices (such as slides or trays), mounting rigidity, electromagnetic shielding, cooling pathways, fans (if needed), separate power supply (if needed), bill and/or voucher storage, and having an external shape needed to mount inside existing gaming cabinets in the desired place and manner (i.e., in place of a bill acceptor, in a specified corner or location, etc.). Any such enclosure or structural shape meeting the needs of the logical devices, the device components, and internal and external mounting requirements is within the meaning of the combination device main body enclosure, hereinafter referred to as the enclosure, or, the main body enclosure.

The present invention connects to existing game motherboards using the standard bill acceptor interface (alternatively, if a voucher printer/reader is used instead of a bill acceptor, then this device will use that interface). This is all that is needed as far as connections to the existing gaming machine logic goes—this enables existing machines to be retrofitted with the combination device disclosed with no hardware changes to the game board (in this disclosure, the phrases "motherboard", "main processor board", "processor board", and "game board" all refer to the same thing in a gaming machine; namely, the logic board having the main processor and software needed to run the game machine).

In addition, combination device 320 includes a standard Ethernet port 316. This enables any installation that has ethernet connections (LAN wiring) available to each game machine to use a backend system to control all devices except the bill acceptor; the bill acceptor would still work through the existing game machine bill acceptor hardware and software. Where ever ethernet is available to individual gaming machines, it is expected that the system controller-will be configured to send and receive bill acceptor information through the serial port to and from the existing motherboard serial port, while channeling all other information through the ethernet port, preferably using protocols based on TCP/IP, to the backend system that will process the information and send back any needed response or information. However, the system controller can be configured to use only the ethernet port or only the serial port. If all bill acceptor data is sent through the ethernet port, then the gaming device motherboard must be configured to receive information through an ethernet connection to process bill information, or, a backend system will process the bill acceptor data and send credit information to the game machine using the standard serial ports. Any such configuration is fully contemplated by the present invention.

Although it is expected that the majority of combination devices sold will incorporate bill acceptors, it is fully contemplated that a significant portion will make use of voucher readers/printers instead of bill acceptors. The architecture of the product will remain the same, with the voucher reader/printer substituted for the bill acceptor. In some jurisdictions, on example being Amerindian casinos in the State of Washington, gaming machines are required to have voucher readers/printers rather than bill acceptors. In such jurisdictions the configuration of the present invention will include a voucher reader/printer and appropriate face-plate rather than a bill acceptor. If a voucher printer/reader is used instead of a bill acceptor, then one preferred configuration will be to use the Ethernet interface and communicate to a backend system that will process the voucher data, and then send credit information to the game machine. If the combination device is being sold into a legacy casino (not having Ethernet connections available on the floor), then the embodiment used will communicate through the existing network connections (serial ports). U.S. Pat. No. 6,500,067 entitled "Voucher Gaming System" is hereby explicitly referenced and incorporated in full herein, showing the workings of a voucher gaming system and the role of voucher reader/printers.

Figure 4:
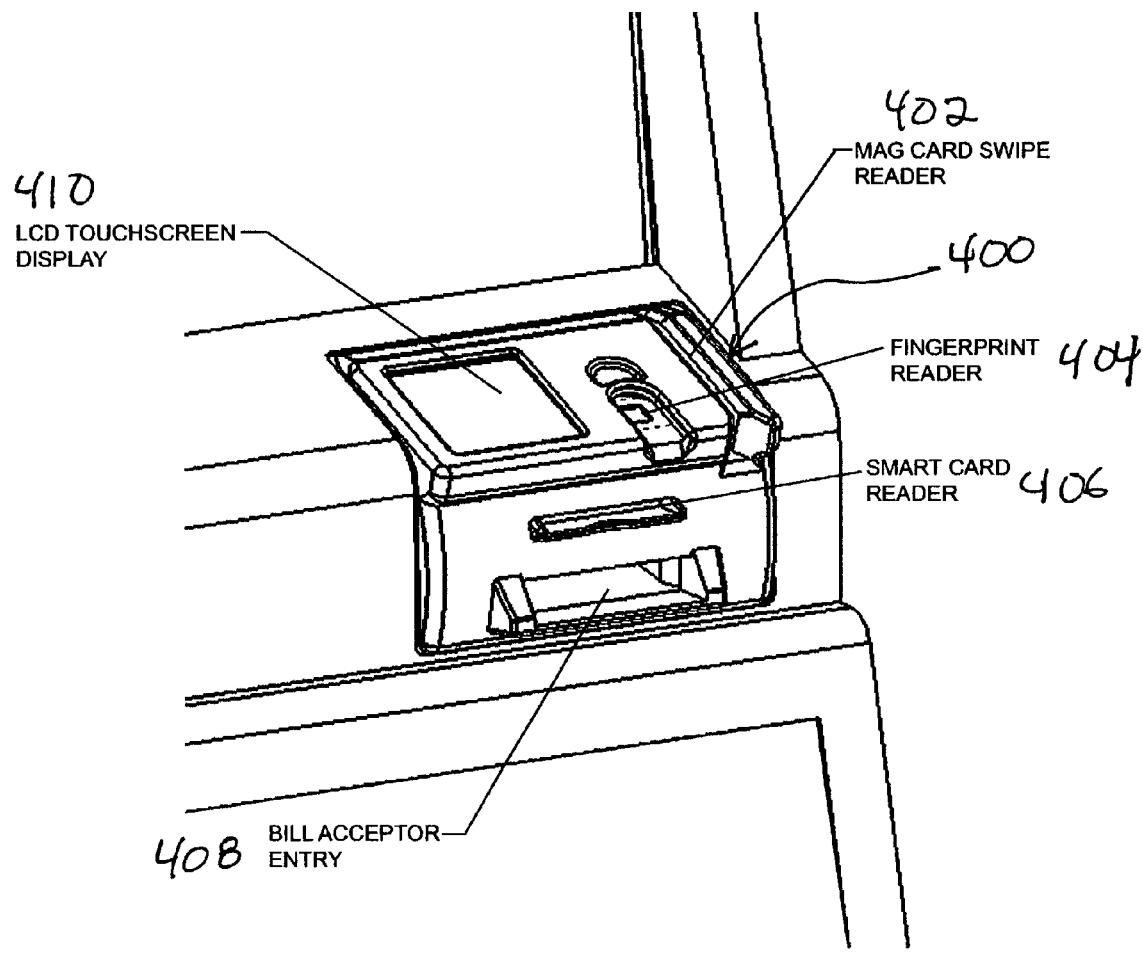
FIG. 4 is a perspective view of a gaming having a second embodiment of a device according to the present invention.

FIG. 4 illustrates another embodiment of the present invention, for use with a gaming machine where the front door can be modified. As with the combination device shown in FIG. 2, Combination Device 400 has a magnetic stripe card reader 402, a fingerprint reader 404, a smart card reader (or dock) 406 (shown as horizontal but may be vertical), a bill acceptor guide or entry part (or voucher guide) 508, and an LCD touchscreen 410.

Figure 5:
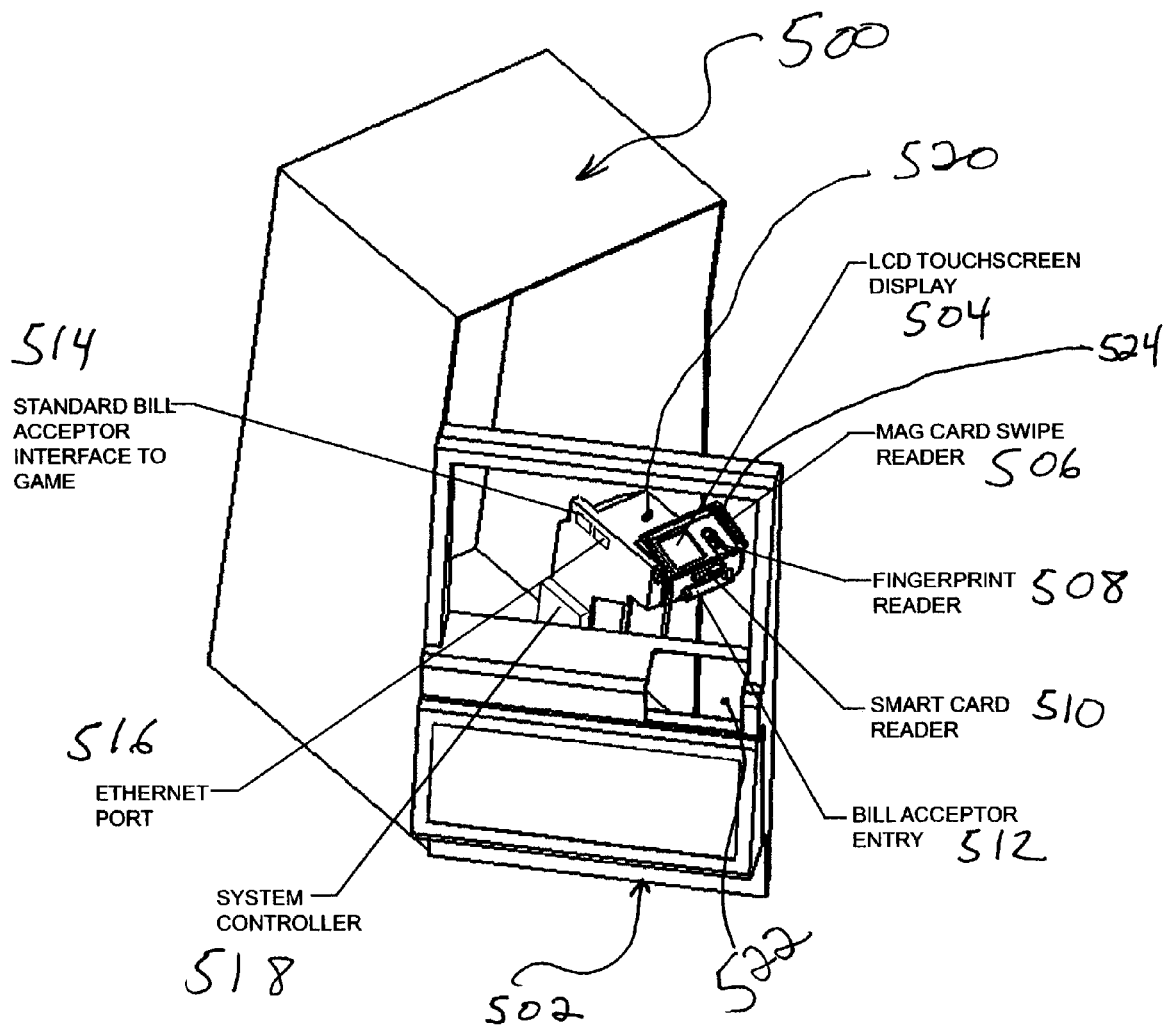
FIG. 5 is a another perspective view of a gaming having a second embodiment of a device according to the present invention.

FIG. 5 shows game cabinet 500 having its front door 502 open, using the combination device shown in FIG. 4. In this embodiment, the entire combination device 520 is a single unit. When front door 502 is opened for service by casino personnel, the player I/O devices on face-plate 524 stay fixed, passing through opening 522. This reduces the device complexity and ease of servicing by having no external wiring, such as that needed by the embodiment shown in FIGS. 2 and 3. It does require a minor door modification for existing gaming machines, so it is expected that casinos will retrofit their games that are on the casino floor using the embodiment from FIGS. 2 and 3, while new machines or machines that are pulled off the floor for major refurbishment will use the embodiment shown in FIGS. 4 and 5.

Face plate assembly 524 comprises an LCD touchscreen display 504, magnetic stripe card reader input portion 506, fingerprint reader portion 508, smart card reader (or dock) 510, and bill acceptor entry slot 512 (feeds bills to the bill acceptor portion of device controller assembly 520). Device controller assembly 520 contains system controller (combination device system controller) 518, which contains the logic needed to receive signals from each of the input devices that are part of the device controller assembly 520 and on face-plate assembly 524. In addition, system controller 518 contains the logic needed to interpret, reformat (or simply format, depending on the input signals), and send the data received from any of the input devices in this assembly to the standard bill acceptor interface 514.

The gaming machines' connector to a standard bill acceptor is also used with this embodiment of the present invention. This is all that is needed—this enables existing machines to be retrofitted with the combination device disclosed with no hardware changes to the motherboard. In addition, device controller assembly 520 includes a standard Ethernet port 516, used in installations having ethernet connections available to each game machine.

Figure 6:
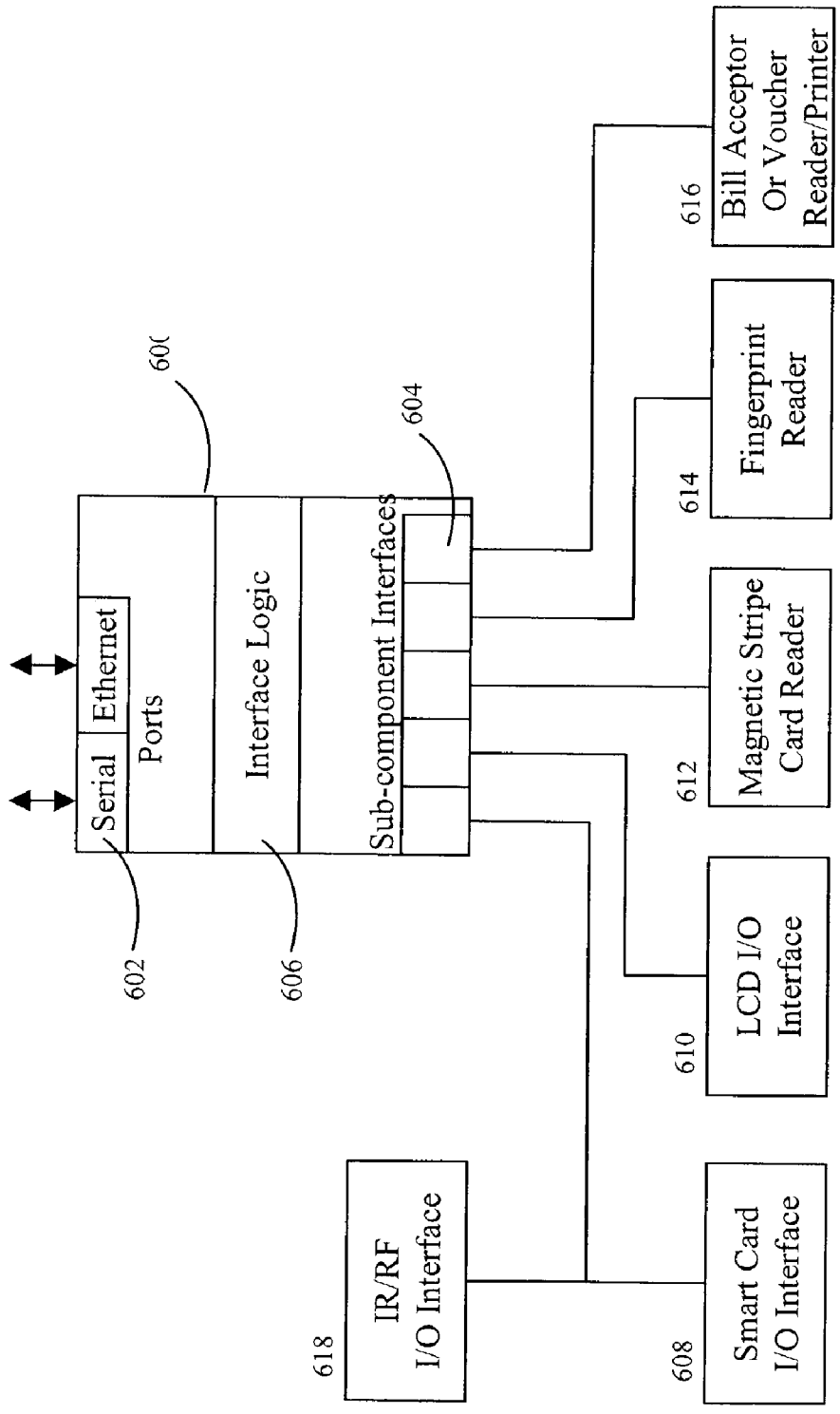
FIG. 6 is a block diagram of a combination device system controller according to the present invention.

FIG. 6 is an architectural block diagram of the combination device system controller. The system controller 600 has at least two ports (generally, 602), a serial port and an ethernet port. For standalone machines the ethernet port may be optional, but one currently preferred embodiment is to provide the ethernet port in all cases because (i) ethernet connectivity may become available at the individual machine level at a later date in a casino, as ethernet infrastructure is relatively inexpensive, and (ii) it is currently projected that the cost savings in eliminated the port is not enough to justify the expense of two controller boards, as most installations are expected to want the ethernet port. Having controllers with both an ethernet port and a serial port or just a serial port will depend on customer demand and the cost of materials.

The system controller also has a set of component interfaces, shown generally as 604. Each interface is currently expected to be uniquely assigned to each available sub-component in the combination device; however that is a design decision that could change depending on how the specific sub-component interfaces evolve over time. In any event, there will be interfaces (electrical, optical, etc.) as needed for each sub-component, interfacing to the system controller logic 606.

Shown are the currently intended sub-components to be combined with a fingerprint reader 614. It is currently expected that all embodiments will have bill acceptor or voucher reader/printer 616 with fingerprint reader 614. Those two sub-components form the "core" set of sub-components.

Although the embodiments presented have shown bill acceptors and voucher reader/printers as an "one of the other" situation, there are operations having both on a single gaming machine. In order to accommodate both in one unit, it is expected that the configuration type shown in FIGS. 4 and 5 will be needed. The combination device 520 in FIG. 5, if having both a bill acceptor and a voucher reader/printer, will need to be larger than the typical bill acceptor alone so will need to be used with a modified door.

It is currently a preferred embodiment to also have LCD interface 610 and magnetic card reader 612. The card reader can be used with a plurality of cards already in common use in casinos, and may be used in conjunction with the ability to enter PIN numbers on the LCD touchscreen (alternatively, the LCD touchscreen can accept PIN number input without a card). There is an immediate need and use for these I/O devices, so the most preferred embodiment will have these two as well as the fingerprint reader and one of: a bill acceptor; or, a voucher reader/printer.

The smart card interface ("dock"), 608, is expected to become popular in the future, but is currently not expected to be in the most common selling units. There are also the infrared (IR) transceiver and/or the RF (e.g., Bluetooth) interfaces, which are currently rising in popularity but have not yet reached critical mass in the casino market place; as soon as there is a need, these will be included in the combination device of the present invention. In the near-term the most common implementation of the combination device of the present invention, assuming a networked environment, is expected to include fingerprint reader 614, bill acceptor or voucher reader/printer 616, magnetic card reader 612, and LCD touchscreen 610. If applied to standalone machines, the configuration will preferably further include at least one of: a smart card interface; an IR interface; or, an RF interface.

System controller 600 contains logic to interface all devices to the serial port, or, the bill acceptor or voucher reader/printer to the serial port and the rest to the ethernet port, or, all devices to the ethernet port. These may be separate controllers but are currently expected to be settable parameters in a single controller. The configuration using only Ethernet is not expected to be in use for some number of years, as legacy gaming machines and associated casino infrastructure will require a serial port for the foreseeable future.

The primary purpose of the system controller of the present invention is to pass information to and from the devices; to primarily be a protocol converter and communications and related state buffer. It will also have the capacity to do basic data comparisons and the like, allowing for certain local processing as would be expected in a small embedded controller/system (i.e., is currently expected to include a reasonably powerful microcontroller). However, it is not expected to process the information at a high level, i.e., make complex calculations to enable decisions to be made about the content of the messages per se. That is partially what enables the system controller to be a reasonable size and needing minimal power.

The present invention is fully usable and compatible with standalone gaming machines, gaming machines which are networked using the provided Ethernet port, and gaming machines networked using an existing network connection through the motherboard of the gaming machine. In each case, the system controller will convert and send information from and to the sub-components in the way matching the configuration.

In the standalone environment, there are two types of installation possible. First, all the inputs from one or more of the player I/O devices (excepting the bill acceptor) will be handled internally to the combination device of the present invention. From the gaming machine's view, this will appear to be a standard bill acceptor and nothing else. Fingerprint data would be handled internally to the combination device of the present invention. A fingerprint is read on the reader, and is compared to data taken from an inserted smart card (note: the designation of a "smart card" includes memory cards). Note: the smartcard interface may be replace with an IR or low-powered RF interface, for use with PDAs and similar devices, from which the data may also be read or sent. If the card is a genuine smart card, or PDA-type device using in IR or RF interface, then the card or PDA can do the data comparison (the system controller will pass the data from the fingerprint reader to the device's interface and there through to the device). Alternatively, the logic in the system controller can also do a data compare of the already processed data from the two sources.

In another preferred embodiment, a magnetic swipe card is used and the player is asked to enter a PIN which must match the PIN number just read from the card, to enable funds transfers from the card to the machine. When game credits are being transferred, the combination device send signals to the gaming machine using the bill acceptor interface just as if currency of the equivalent denomination had been inserted into the bill acceptor.

For networked gaming machines using the present invention's Ethernet port, no more work is needed to install the present device in gaming machines than explained above. Although not a preferred embodiment, this enables the combination device to comprise a bill acceptor and only a fingerprint reader, with the data read from the fingerprint reader compared with data sent to, or received from (depending on memory considerations of the local fingerprint reader) a central system having a database containing many player's fingerprint data. There is no need for a smartcard in this example embodiment. Alternatively, the local combination device could function the same as the standalone device for an initial identity check, but once identity was confirmed it would enable a player to make use of EFT money (game credit) transfers from a central system.

Where the Ethernet port is not used, then all device communications will be sent through the serial port to the motherboard. This will require a minor modifications to the driver on the motherboard. When the driver receives commands or packet contents it does not understand (can't process or route, as is the case with communications from the bill acceptor), it needs to pass them up to higher-level software or, alternatively, pass the communications through to the game's existing external serial port to backend machines. In either case, all communications to and from the devices will be translated into the serial line protocol and passed to the motherboard. The motherboard's drivers and/or higher-level software will then reformat the information (if needed) and/or pass it to the game's existing network link to the game controllers, accounting systems, or other systems.

What is claimed is:

1. A user interface retrofitted to a gaming machine, the user interface comprising:
    a face plate assembly including a fingerprint reader, a liquid crystal display (LCD), and a bill acceptor;
    a main enclosure positioned within a gaming machine cabinet, wherein the main enclosure is in communication with the face plate assembly;
    a preexisting gaming machine connection to communicate with a gaming machine motherboard, wherein the preexisting gaming machine connection is originally configured to communicate with a bill acceptor or a voucher printer/reader; and
    a user interface controller in communication with the fingerprint reader, LCD, and the bill acceptor, wherein the user interface controller is retrofitted to the gaming machine via the preexisting gaming machine connection.

2. The user interface of claim 1, wherein the face plate assembly is mounted to a main door of the gaming machine.

3. The user interface of claim 1, wherein the face plate assembly is mounted to the main enclosure.

4. The user interface of claim 1, wherein the face plate assembly further includes a magnetic stripe reader.

5. The user interface of claim 1, wherein the face plate assembly further includes a smart card reader.

6. The user interface of claim 1, wherein the face plate assembly further includes a voucher printer/reader.

7. The user interface of claim 1, wherein the preexisting game machine connection is a serial connection or an Ethernet connection.

8. A gaming machine, comprising:
    a processor board, wherein the processor board is in communication with one or more components via one or more preexisting game machine connections; and
    a user interface system comprising:
        a fingerprint reader;
        one or more components, wherein the components are selected from the group consisting of a liquid crystal display (LCD), a bill acceptor, a magnetic stripe reader, a smart card reader, a voucher printer/reader, and combinations thereof; and
        a user interface controller in communication with each component of the user interface system, wherein the user interface controller is retrofitted to the gaming machine and utilizes one preexisting game machine connection to communicate with the processor board, wherein one preexisting game machine connection is the bill acceptor interface.

9. The gaming machine of claim 8, wherein the preexisting game machine connection is a serial connection or an Ethernet connection.

10. The gaming machine of claim 8, wherein components of the user interface system are mounted to a main door of the gaming machine.

11. The gaming machine of claim 8, wherein the user interface further comprises a main enclosure positioned within a gaming machine cabinet, wherein the main enclosure stores paper currency or vouchers received from the bill acceptor.

12. The gaming machine of claim 11 wherein the components of the user interface are mounted to the main enclosure, and wherein the components are accessible to a player through an opening on a main door of the gaming machine.

13. The gaming machine of claim 8, wherein the user interface controller further comprises:

a sub-component interface having a plurality of component interfaces, wherein each user interface component is connected to the component interface;

an interface logic in communication with the sub-component interface, wherein the interface logic receives and processes input signals from each user interface component; and at least one port in communication with the logic interface, and the port being connected to the preexisting game machine connection, wherein processed input signals are sent to the processor board via the preexisting game machine connection.

* * * * *